July 2, 1946.  P. ROSSI  2,403,402
TURNBUCKLE
Filed July 19, 1943  4 Sheets-Sheet 1
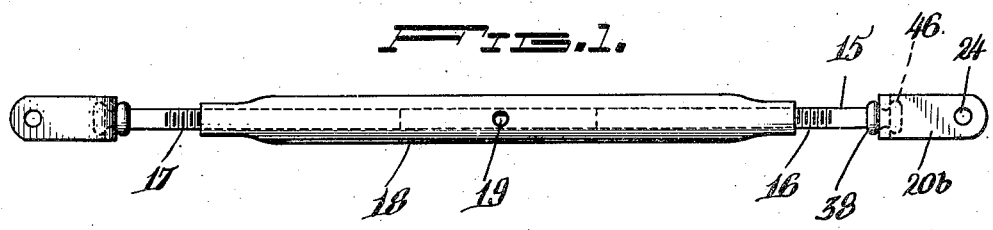
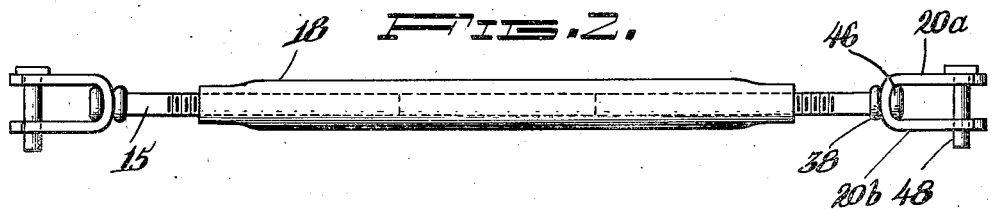
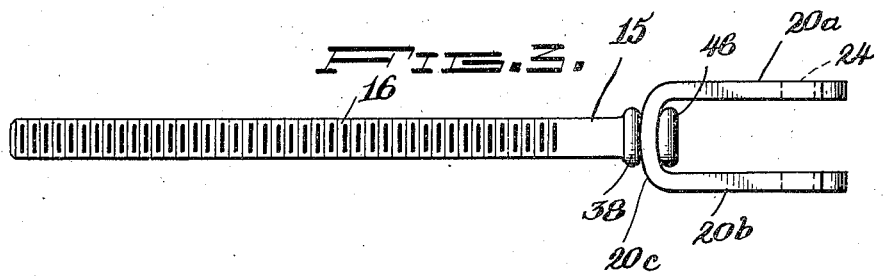
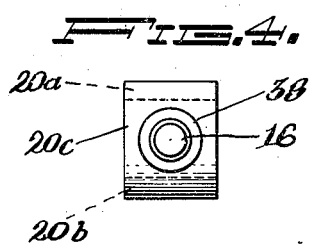 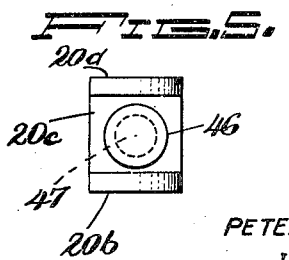
PETER ROSSI
INVENTOR.
BY *Alexander Cleucher*
ATTORNEY.

July 2, 1946.  P. ROSSI  2,403,402
TURNBUCKLE
Filed July 19, 1943  4 Sheets-Sheet 2
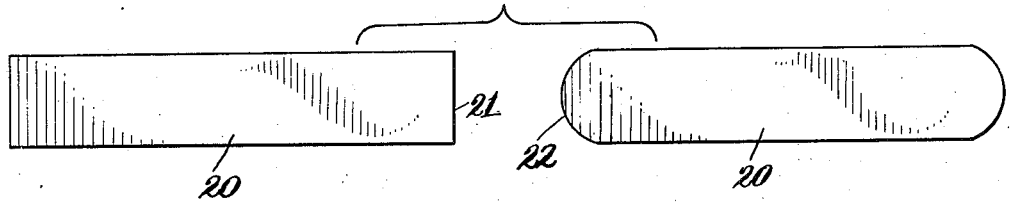
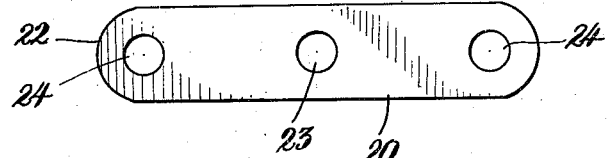
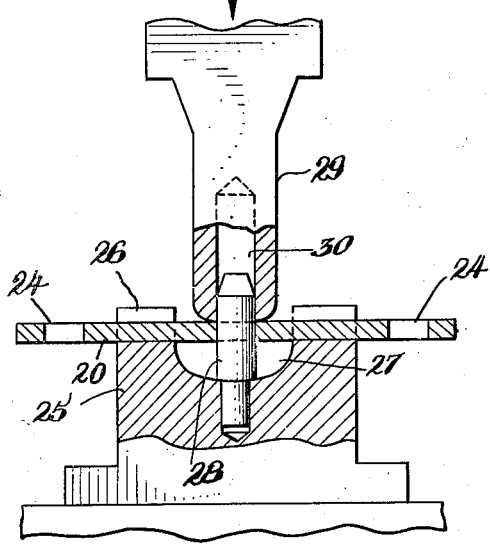
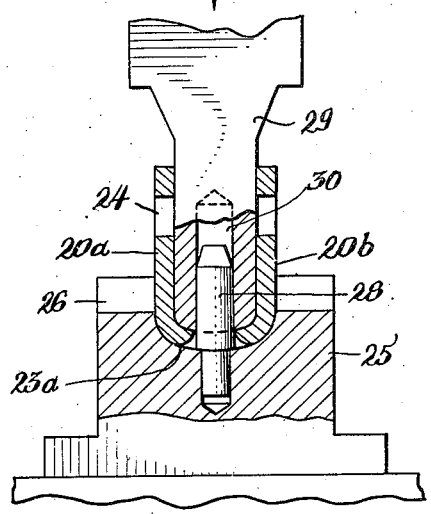
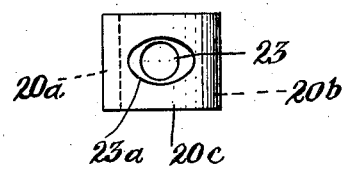
PETER ROSSI
INVENTOR.
BY *Alexander Bleecher*
ATTORNEY.

July 2, 1946.  P. ROSSI  2,403,402
TURNBUCKLE
Filed July 19, 1943  4 Sheets-Sheet 3
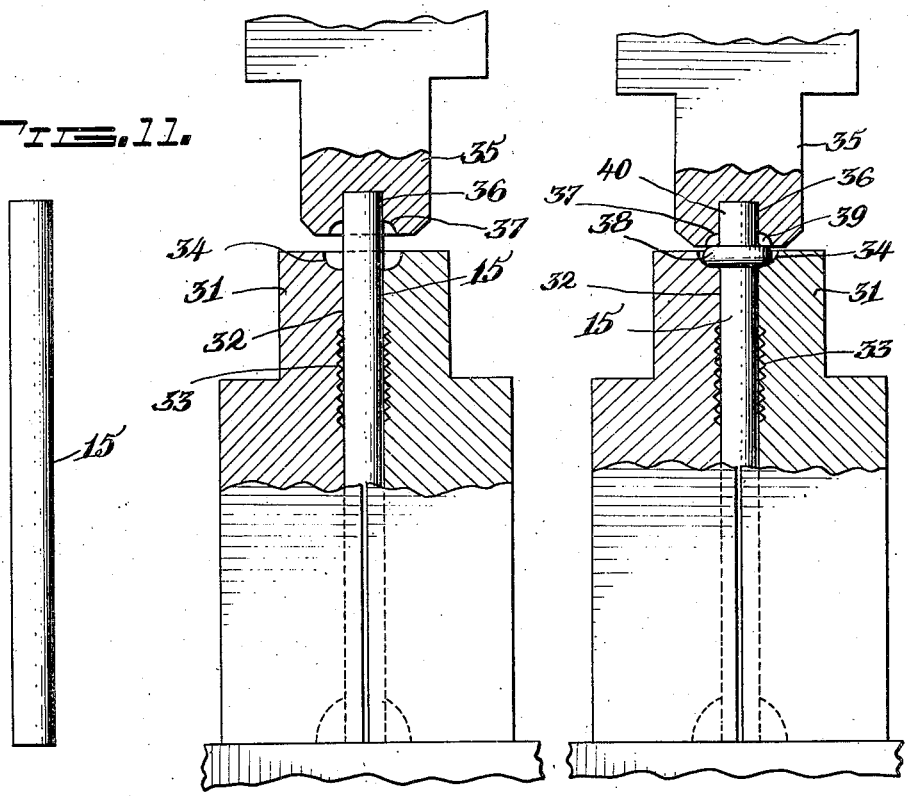
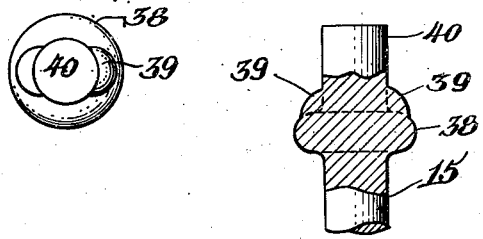
PETER ROSSI
INVENTOR.
BY
ATTORNEY.

PETER ROSSI
INVENTOR.

BY *Alexander Blucher*

ATTORNEY.

Patented July 2, 1946

2,403,402

UNITED STATES PATENT OFFICE 2,403,402

TURNBUCKLE

Peter Rossi, Brooklyn, N. Y., assignor to Joseph W. Yellen, New York, N. Y.

Application July 19, 1943, Serial No. 495,267

2 Claims. (Cl. 287—103)

This invention relates generally to turnbuckles, but more specifically to a method of manufacturing and the construction of a rod with a jaw attached in conjunction with a connector.

The main object of the invention resides in a method of manufacture and in the construction of a rod with a jaw attached for a turnbuckle assembly wherein both the rod and jaw elements are separately formed from metal pipe and plates and subsequently mechanically joined together for cooperation with the conventional turnbuckle connector.

A further object of the invention resides in the simplicity and economy of manufacturing jaws with rods attached as a part of a turnbuckle assembly wherein the elements of strength, durability and function compare favorably with present day integrated rods and jaws.

Another feature of the invention is found in the method and means of rigidly and non-rotatively joining the jaw and rod together without resorting to welding or forging.

These objects and other incidental ends and advantages of the invention will hereinafter appear in the progress of the disclosure and as pointed out in the appended claims.

Accompanying this specification are drawings showing a preferred form of the invention wherein corresponding reference characters designate corresponding parts throughout the several views and wherein:

Figure 1 is a side view in elevation showing a turnbuckle assembly with reversely threaded rods and jaws attached engaging a connector.

Figure 2 is a top plan view of Figure 1.

Figure 3 is an enlarged top plan view of a threaded rod mechanically joined to a jaw in accordance with the invention.

Figure 4 is an end view in elevation of Figure 3 taken from the left end thereof.

Figure 5 is an end plan view of Figure 3 taken from the right end thereof.

Figure 6 is a plan view of a blank from which the jaw is fabricated, the right side of the view showing the end edges of the blank rounded.

Figure 7 is a plan view of the blank orificed for subsequent engagement with a turnbuckle rod and with a jaw bolt.

Figure 8 is a vertical and partially sectioned view of male and female portions of a bending die conventionally mounted on a power press to bend the blank into the form of a jaw, the latter being shown in position on the female die portion before the downward stroke of the male die portion.

Figure 9 is a view similar to Figure 8 showing the jaw blank bent in U-formation at the downward stroke of the male portion of the die.

Figure 10 is a bottom plan view of the jaw after the bending operation.

Figure 11 is a front view in elevation of a simple rod cut to longitudinal dimensions before being treated for jointing with the jaw.

Figure 12 is a vertical and partially sectioned view of the male and female parts of a die conventionally mounted in a power press and showing the rod therein contained before the downward stroke of the male portion to effectuate a seat or annular flange with diametrically disposed lugs thereon adjacent the upper end of the rod.

Figure 13 is a view similar to Figure 12 showing the formation of said flange and lugs.

Figure 14 is a view in elevation of the rod after removal from the flange and lug forming die.

Figure 15 is an enlarged end view in elevation of Figure 14 taken at the left hand side thereof.

Figure 16 is a fragmentary and enlarged partially vertical sectional view of the flange and lug portion of the rod.

Figure 17:
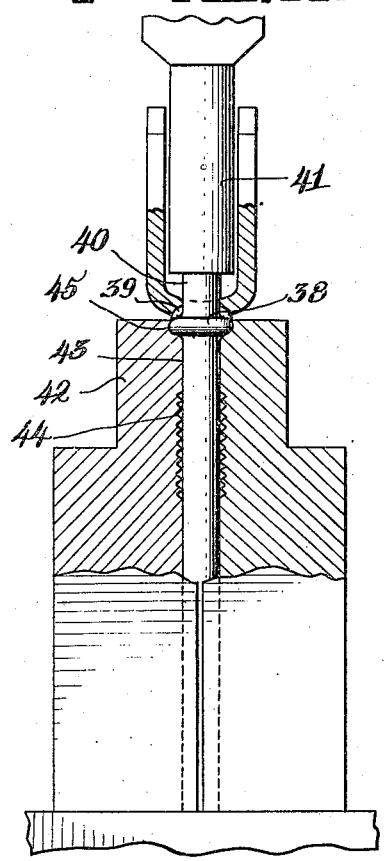
Figure 17 is a vertical and partially sectioned view of a hammer and stockholder showing the stockholder engaging the flanged rod and the hammer abutting the upper portion of the rod adjacent the flange, the jaw being mounted on said rod portion.

In accordance with the invention and the preferred form shown, the turnbuckle assembly is comprised of the conventional parts such as opposing independent rods 15 being provided with reversely threaded ends 16 and 17 engaged in a connector 18 whereby the said rods may be tightened or loosened as the connection may require by the rotation of the connector through a wrench or instrument engageable therewith at a nutted area thereof or as shown at the central portion having an opening 19 to prevent slippage of the rotating instrument. The turnbuckle shown is provided with jaws at the ends of the rods 15, and the invention specifically relates to the separate fabrication and connection of the rod and jaw portions.

In the manufacture of the turnbuckle rod and jaw, properly dimensioned metallic rods of desirable material such as steel or steel-alloy material are cut down to the proper lengths. Thereafter blanks 20 are cut to the desired dimensions from metallic sheets or plates such as steel or steel alloy, the blanks as shown being rectangular and having transverse edges 21. Edges 21 are rounded as indicated by numeral 22 and thereafter a central and end orifices 23 and 24 are punched out, the middle orifice 23, as will hereinafter appear, being treated to receive one end of rod 20 while the end orifices 24 are adapted to receive a bolt 48 as also will hereinafter appear.

Blank 20 after the rounding of corners 22 and the punching out of the orifices 23 and 24 is then heated red hot and placed in a power press provided with a female die portion 25 having a depressed support 26 at the upper face thereof for blank 20 and being provided with an elongated U-shaped recess 27 having a length equal to the width of blank 20 and having a central pin 28 which is adapted to penetrate the orifice 23 of blank 20 for centering purposes. The male portion 29 of the die is provided with a central and cylindrical opening 30 to receive pin 28 and is adapted to bend blank 20 in recess 27 to form a jaw thereof having side walls 20a and 20b and a rounded bottom wall 20c as shown in Figures 8, 9 and 10. The central orifice 23 at the under side of the base 20c assumes an elliptical figuration 23a by virtue of the bending operation and is utilized to prevent relative rotation when the rod 15 and the jaw are jointed together as will hereinafter appear. Following the bending operation the jaw is suitably cooled.

Rod 15 after it has been cut to its proper length is heated at one end and introduced in a type of die having a female portion comprised of similar and opposing parts. Thus, each part 31 of the female portion is provided with an elongated and vertical central semicylindrical bore 32 having a gripping portion 33 and semi-annular trough 34 extending from the upper face thereof, the female portion of the above described die cooperating with a male portion 35 having a short and vertical central cylindrical bore 36 to engage the upper end of rod 15, the lower face of die portion 35 being provided with diametrically opposed recesses 37 off bore 36, the recesses being disposed inwardly of the trough 34. Upon the downward stroke of the male portion 35 of the die, a flange or seat 38 is formed within the trough 34 while a pair of lugs 39 are formed within the recesses 37 and project upwardly from the flange. Upon the removal of the rod 15 with the flange and lugs 39 formed thereon as shown in Figures 14, 15 and 16, the flanged end of rod 15 may be further heated if the prior heating of the rod has not cooled to too great an extent for purposes of permanently joining the jaw against the seat 38.

Figure 18:
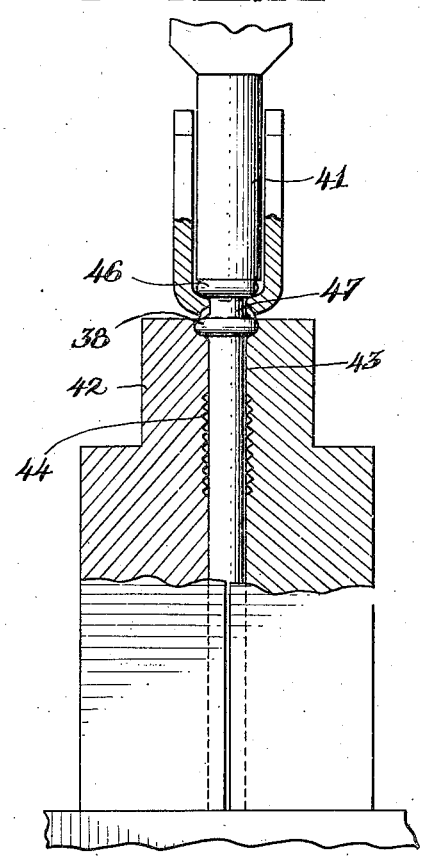
Figure 18 is a view similar to Figure 17 showing the joint made between the jaw and the rod at the downward stroke of the hammer.
Figure 19:
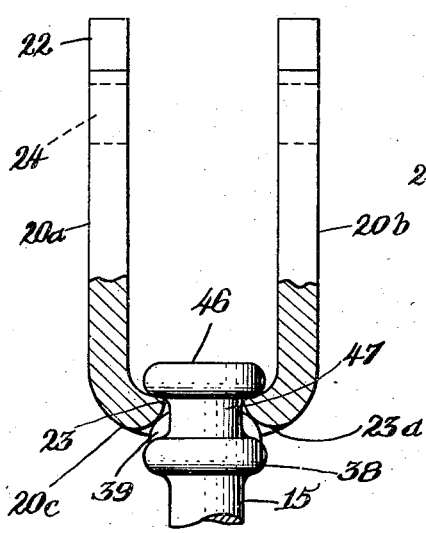
Figure 19 is an enlarged and fragmentary front view in elevation partially in section showing the joint between the upper end of the rod and the jaw.
Figure 20:
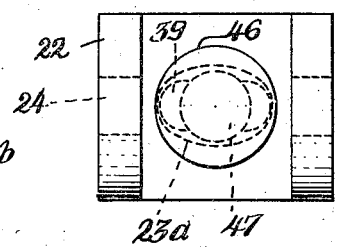
Figure 20 is a top plan view of Figure 19.

The connection between rod 15 and the jaw is effected by the use of a hammer 41 which is adapted to form a head over the rod end 40 situated over base 20c of the jaw. Thus hammer 41, as shown in Figures 17 and 18 cooperates with a stockholder having similar and opposing parts 42, each of said parts being provided with a central and vertical semi-cylindrical bore 43 for rod 15 and has a gripping portion 44 and a semi-annular recess 45 to accommodate flange 38, the lugs 39 fitting in the elliptical portion 23a of orifice 23. On the downward stroke of hammer 41, end 40 is compressed to a flanged formation 46, the portion of rod 15 between flange 46 and flange 38 being indicated by a neck 47. By the joint formed as above described between rod 15 and the jaw, a rigid connection is effected and is relatively non-rotative by virtue of the engagement of lugs 39 in the ends of the elliptical portion 23a on the underside of base 20c. After the hammering operation, the rod and jaw are cooled and the rod is properly threaded.

In the formation of the jaw from blank 20 having side arms 20a, 20b and a base 20c, it is to be noted that the end orifices 24 come to alignment for engagement therein of a bolt 48 which latter may have a cotter pin at the end thereof to prevent withdrawal, said cotter pin not being shown in the drawings.

The rod and jaw construction in accordance with the above description provides a product which may be utilized in conjunction with conventional connector elements of turnbuckles. As has been noted, no welding or forging is necessary in the manufacture thereof and the junction between the jaw and rod is rigid, strong, durable. The materials from which the rod and jaws are fabricated may come from standard stock.

I wish it understood that all minor changes and variations in the order of the steps described and in the steps themselves together with variations in the integration, location and material of parts of the invention may all be resorted to without departing from the spirit of the invention and the scope of the appended claims.

I claim:

1. In a turnbuckle assembly, a connector, a rod in threaded engagement therewith, a jaw having a base member provided with an aperture therein, the aperture adjacent the lower surface of the base member being elliptical, the rod at the lower end thereof penetrating said aperture, a flange at the end of the rod engaging the upper surface of said base member adjacent the aperture, and a pair of aligned lugs on the rod spaced from said flange engaging the aperture adjacent the elliptical portion whereby a rigid and non-rotatable joint is formed between the jaw and the rod.

2. In a turnbuckle assembly, a connector, a rod in threaded engagement therewith, a jaw having a base member provided with an aperture therein, the aperture adjacent the lower surface of the base member being elliptical, the rod at the outer end thereof penetrating said aperture, means at the end of the rod to engage the upper surface of said base member adjacent the aperture and means spaced from said first mentioned means on the rod to engage the aperture adjacent the elliptical portion whereby a rigid and non-rotatable joint is formed between the jaw and rod.

PETER ROSSI.